(12) United States Patent
Dronadula et al.

(10) Patent No.: US 9,628,292 B2
(45) Date of Patent: Apr. 18, 2017

(54) INTELLIGENT BRIDGING OF WI-FI FLOWS IN A SOFTWARE-DEFINED NETWORK (SDN)

(71) Applicant: Meru Networks, Sunnyvale, CA (US)

(72) Inventors: Lakshmi Narayana Dronadula, Karnataka (IN); Ajay Malik, Sunnyvale, CA (US); Avinash Bhagtani, Pleasanton, CA (US); Saurabh Kumar Agarwal, Bengaluru (IN); Nuwas Ponnambathayil, Bengaluru (IN)

(73) Assignee: Fortinet, Inc., Sunnyvale, CA (US)

( * ) Notice: Subject to any disclaimer, the term of this patent is extended or adjusted under 35 U.S.C. 154(b) by 134 days.

(21) Appl. No.: 14/693,878

(22) Filed: Apr. 23, 2015

(65) Prior Publication Data

US 2016/0315785 A1 Oct. 27, 2016

(51) Int. Cl.
*H04L 12/46* (2006.01)
*H04L 29/06* (2006.01)
*H04W 84/12* (2009.01)

(52) U.S. Cl.
CPC ........ *H04L 12/4633* (2013.01); *H04L 12/462* (2013.01); *H04L 12/4625* (2013.01); *H04L 65/60* (2013.01); *H04W 84/12* (2013.01)

(58) Field of Classification Search
CPC .............. H04L 12/4633; H04L 12/462; H04L 12/4625; H04L 65/60; H04W 84/12
See application file for complete search history.

(56) References Cited

U.S. PATENT DOCUMENTS

| 2014/0351920 | A1* | 11/2014 | Madani | H04L 12/4633 |
| | | | | 726/14 |
| 2015/0172103 | A1* | 6/2015 | DeCusatis | H04L 41/0681 |
| | | | | 370/389 |
| 2016/0112903 | A1* | 4/2016 | Kaushik | H04W 28/0205 |
| | | | | 370/235 |
| 2016/0277291 | A1* | 9/2016 | Lakshmikanthan | H04L 45/507 |
| 2016/0294731 | A1* | 10/2016 | McDaniel | H04L 49/208 |

* cited by examiner

*Primary Examiner* — Paul H Masur
(74) *Attorney, Agent, or Firm* — Law Office of Dorian Cartwright

(57) ABSTRACT

Wi-Fi flows are intelligently bridged in a software-defined network (SDN) controller of a wireless communication network that centrally coordinates data plane behavior. A default mode tunnels packets received at an access point to the SDN controller for layer 2 routing decisions. A bridging policy concerning bridging of specific types of traffic flows for the wireless communication network is received at the SDN. Data plane traffic flow for each of a plurality of access points distributed around the wireless communication network is centrally monitored. New data streams tunneled to the SDN controller are matched to bridging policies with deep packet inspection. Responsive to matching, the tunnel mode is converted to a bridge mode by sending a rule concerning the new data stream to the access point. As a result, subsequent packets of the new data stream are transferred at the access point without tunneling additional packets to the SDN controller).

10 Claims, 9 Drawing Sheets

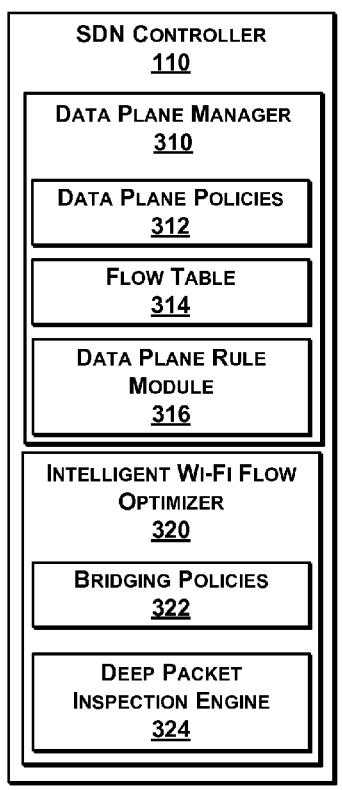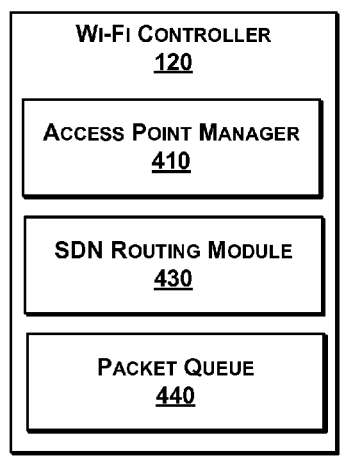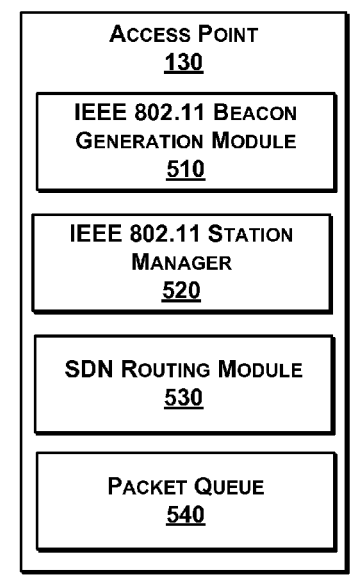
*FIG. 3*  *FIG. 4*  *FIG. 5*

INTELLIGENT BRIDGING OF WI-FI FLOWS IN A SOFTWARE-DEFINED NETWORK (SDN)

FIELD OF THE INVENTION

The invention relates generally to computer networking, and more specifically, to intelligently bridging Wi-Fi flows in a software-defined network (SDN).

BACKGROUND

Wi-Fi networks are widely-available and used more often with the growth of mobile devices. These networks operate under standards such as IEEE 802.11 (promulgated by the Institute of Electrical and Electronics Engineers), and others (e.g., Hot Spot 2.0). Management of these networks will become more burdensome and complex with increasing loads and numbers of connections.

Wi-Fi controllers are coupled to access points of a communication network in order to manage connections with stations seeking access to a backbone network, including the Internet. One aspect of management is the assignment and tracking of BSSIDs (Basic Service Set Identifiers) that identify access points to stations for traffic flows. SDN in the wired backbone supports the wireless portion of a communication network by centrally managing a data plane or layer 2 routing decisions.

However, the benefit of centrally managing data plane behavior comes with a burden of tunneling packets from an access point to an SDN controller. The additional overhead can slow down network performance with additional packet transfers adding to network congestion and processing loads. The effect can be exasperated by flows of local devices sharing a common access point, such as Bonjour services transmitting to nearby stations.

What is needed is a robust technique to intelligently bridge certain flows instead of tunneling.

SUMMARY

These shortcomings are addressed by the present disclosure of methods, computer program products, and systems intelligent bridging of Wi-Fi flows in a software-defined network (SDN) controller in a wireless communication network by centrally coordinating data plane behavior.

In one embodiment, a default mode tunnels packets received at an access point to the SDN controller for layer 2 routing decisions. A bridging policy concerning bridging of specific types of traffic flows for the wireless communication network is received at the SDN. Data plane traffic flow for each of a plurality of access points distributed around the wireless communication network is centrally monitored. New data streams are received at the SDN controller from an access point of the plurality of access points, the new data stream being tunneled from the access point in a default tunneling mode for new data streams at the access point and comprising at least one packet sent from a first station to a second station.

In other embodiments, the SDN controller checks for matches of bridging policies to the new data stream by identifying characteristics of the new data stream with deep packet inspection on at least one packet from the new data stream. Responsive to matching the new data stream to the bridging policy, the tunnel mode is converted to a bridge mode by sending a rule concerning the new data stream to the access point. As a result, subsequent packets of the new data stream are transferred at the access point without tunneling additional packets to the SDN controller.

Advantageously, the network components operate more efficiently by taking advantage of an SDN infrastructure while selectively bridging flows to reduce the overhead imposed by the SDN infrastructure. For example, peer to peer data transfers between stations using services such as Bonjour, occur more quickly.

BRIEF DESCRIPTION OF THE DRAWINGS

In the following drawings, like reference numbers are used to refer to like elements. Although the following figures depict various examples of the invention, the invention is not limited to the examples depicted in the figures.

FIGS. 3-5 is a more detailed block diagram illustrating an SDN (Self-Defined Networking) controller, a Wi-Fi controller, and an access point of the system of FIG. 1, respectively, according to some embodiments.

DETAILED DESCRIPTION

The present invention provides methods, computer program products, and systems for intelligently bridging Wi-Fi flows using SDN (Self-Defined Networking) in a wireless communication network by centrally coordinating data plane behavior. For example, a default tunnel mode can be converted to a bridge mode according to an SDN policy. One of ordinary skill in the art will recognize that many other scenarios are possible, as discussed in more detail below.

Systems to Intelligently Bridge Wi-Fi Flows at an Access Point with an SDN Controller (FIGS. 1-6)

Figure 1:
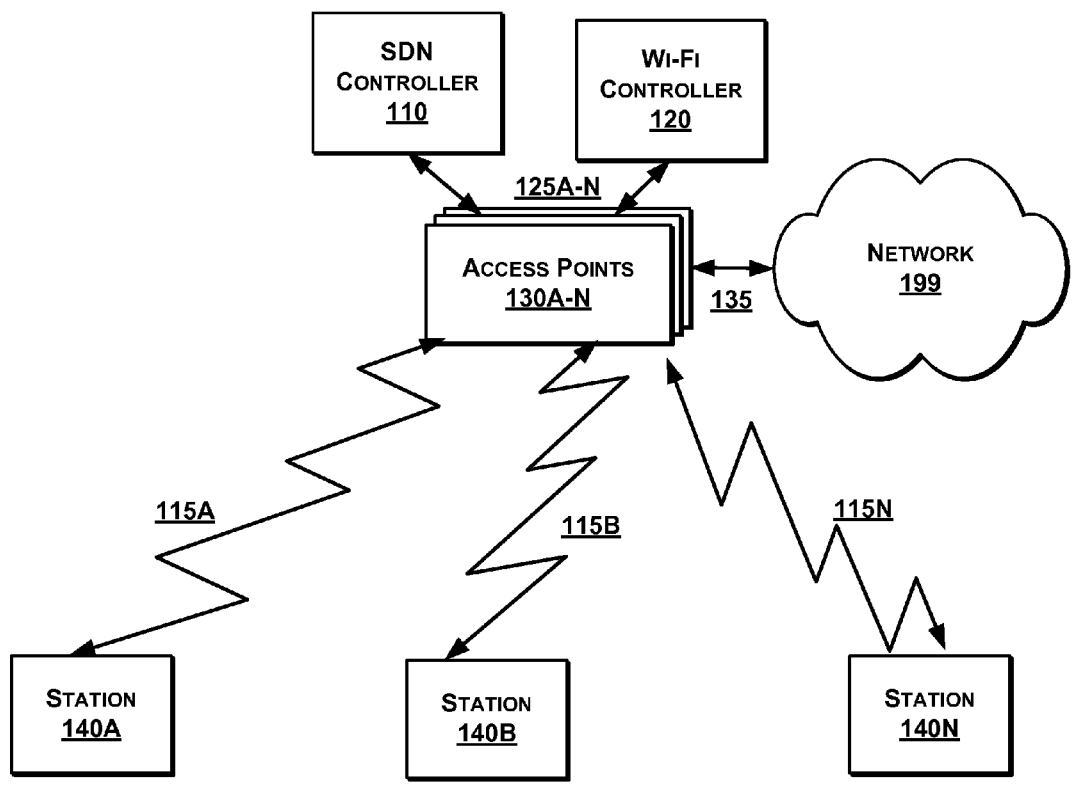
FIG. 1 is a high-level block diagram illustrating a system to intelligently bridge Wi-Fi flows from a centralized data plane in a wireless communication network, according to one embodiment.

FIG. 1 is a high-level block diagram illustrating a system 100 to intelligently bridge Wi-Fi flows in a communication network, according to one embodiment. As referred to herein, bridging refers to short circuiting a larger communication path with a shorter one as described further below. The system 100 comprises an SDN controller 110, a Wi-Fi controller 120, access points 130A-N, and stations 140A-N. The components can be coupled to a network 199, such as the Internet, a local network or a cellular network, through any suitable wired (e.g., Ethernet) or wireless (e.g., Wi-Fi or 4G) medium, or combination. At a high-level, the SDN controller 110 determines when data plan management for access points 130A-N should deviate from a default tunneling mode of sending all packets of a flow to the SDN controller 110, to a bridge mode of handling packets automatically at one or more of the access points 130A-N and/or the Wi-Fi controller 120, in an embodiment. Many other embodiments are possible.

In a preferred embodiment, the stations 140A-N are coupled to the access points 130A-N through wireless communication channels 115A-N, while the access points 130A-N can be coupled to the SDN and Wi-Fi controllers 110, 120 through wired communication channels 125A-N and to network 199 through wired communication channel 135. Other embodiments of communication channels are possible, including a cloud-based controller, and hybrid networks. Additional network components can also be part of the system 100, such as firewalls, virus scanners, routers, switches, application servers, databases, and the like.

Figure 2A:
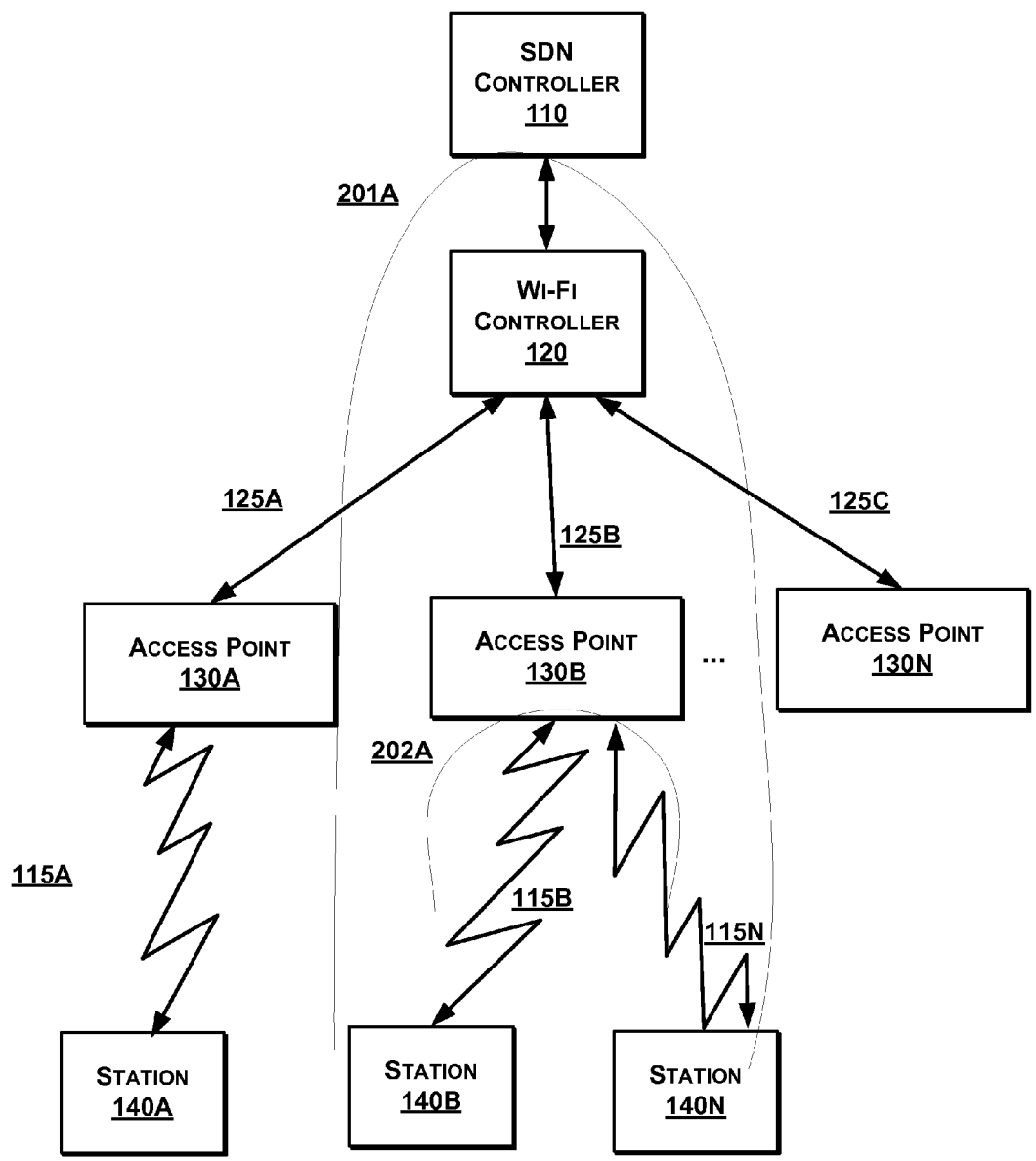
FIGS. 2A-2B are block diagrams illustrating network hierarchies for intelligent Wi-Fi bridging, according to some embodiments.
Figure 2B:
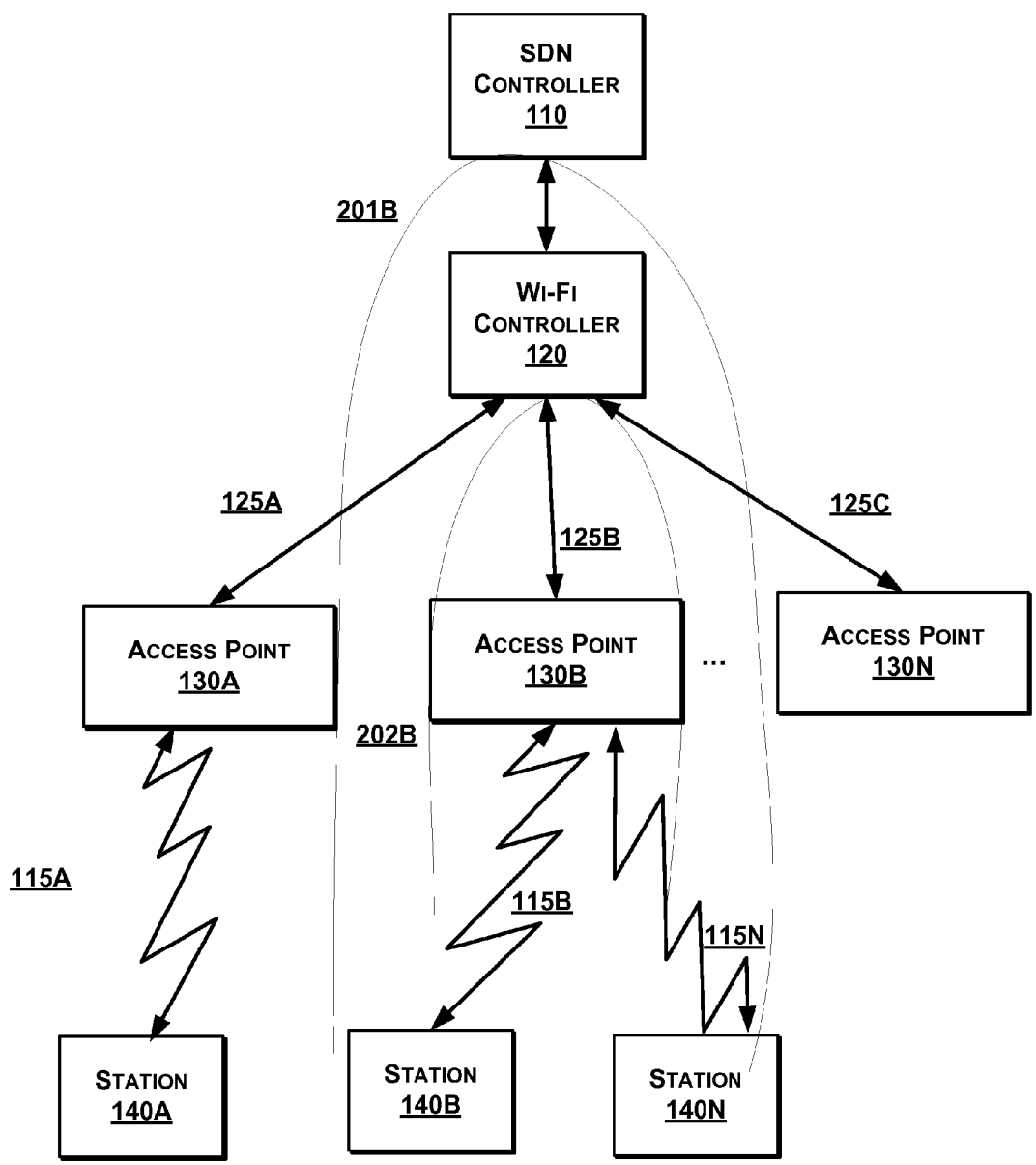

The SDN controller 110 implements various policies (e.g., bridging policies) for network management by centrally managing data plane communications of the system 100. The access points 130A-N, as well as the Wi-Fi controller 120 in some embodiments, tunnel packets to the SDN controller 110 for routing decisions based on policies and/or a system-wide view of layer 2 characteristics and conditions (see 201A and 201B of FIGS. 2A and 2B). Forwarded packets are analyzed to determine, for example, an originating application (e.g., layer 7 application or other process operating above layer 2), a source address and/or a destination address. If no specific policy exists, other layer 2 factors can dominate routing decisions. If a specific policy exists, packets are treated accordingly, such as dropping packets, adjusting priority, adjusting routing, and the like. In some embodiments, the policy directs that a flow or session of packets from an application such a Bonjour be handled through a bridge set up at a particular access point. To do so, the SDN controller 110 sends OpenFlow rules to the particular access points or other components. Subsequent packets of that flow or session will as a result be handled in bridge mode rather than being tunneled. OpenFlow provides cross-vendor communication as an abstraction of vendor-specific internal programming. FIG. 2A shows a network hierarchy in which packets are bridged directly at the access points 130A-N (see 202A), while FIG. 2B shows a bridge implemented by the Wi-Fi controller 120 for access points configured to be in switch mode (see 202B).

More generally, the SDN controller 110 centralizes data plane decision-making for the access points 130A-N. To do so, the access points 130A-N are configured to concede layer 2 routing decisions to the SDN controller 110 by forwarding packets to the SDN controller 110 for routing instructions. The SDN controller can use input gathered across the network to make layer 2 routing decisions for the packets which are communicated back to the forwarding one of the access points 130A-N. In one embodiment, routing decisions are made as a reaction to new or unknown flows. In another embodiment, access points are pre-configured by the SDN controller with rules for automatically implementing SDN controller 110 decisions on matching packets in the future. In still another embodiment, the rules or policies are distributed to the other network devices along a routing path for multi-hop data plane control.

Figure 9:
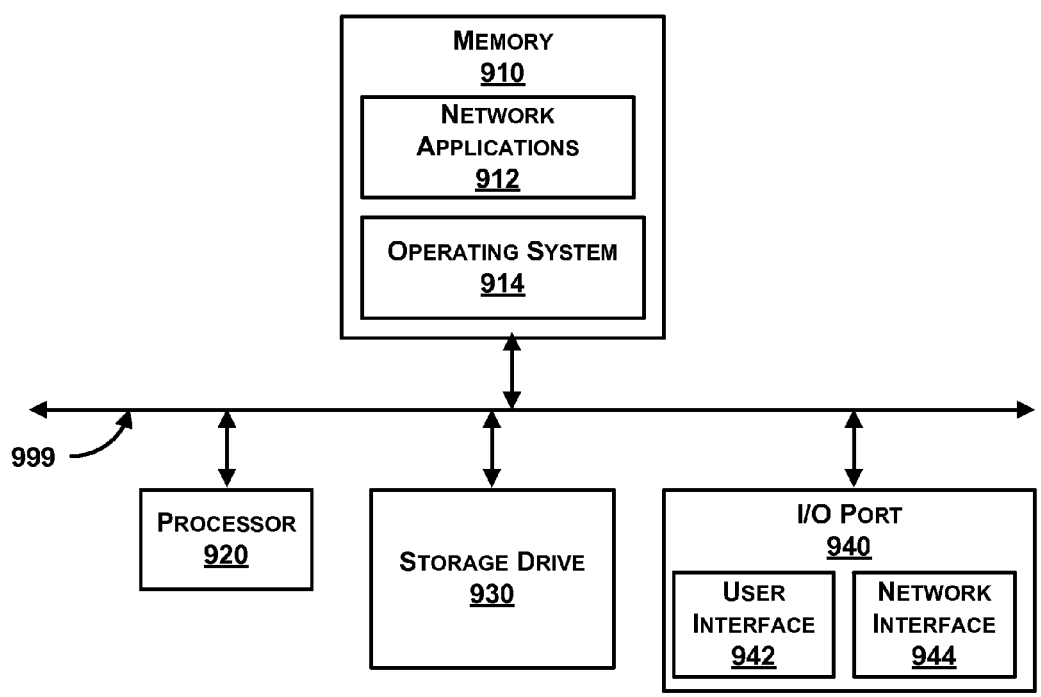
FIG. 9 is a block diagram illustrating an exemplary computing device, according to one embodiment.

The SDN controller 110 can be, for example, a personal computer, a laptop computer, a server, a cloud-based device, a virtual device, or the like implemented in any of the computing devices discussed herein (e.g., see FIG. 9). Additional embodiments of the SDN controller 110 are discussed with respect to FIG. 3.

The Wi-Fi controller 120 tunnels packets to the SDN controller 110, on behalf of the access points 130A-N, such as when the Wi-Fi controller 120 manages a group of the access points 130A-N, in some embodiments. In other embodiments, the tunnel bypasses the Wi-Fi controller 120 (see FIG. 2A versus FIG. 2B). In some cases, the Wi-Fi controller 120 received OpenFlow rules for implementation. Other functionalities of the Wi-Fi controller 120 include communication with each of the access points 130A-N to manage wireless connections to the stations 140A-N using IEEE protocols. In some embodiments, BSSIDs (Basic Service Set Identifiers) are managed from the Wi-Fi controller 120 to implement functionality such as seamless mobility for transparent handoffs of stations between access points all having a common BSSID. In other functionality such as virtual port, the Wi-Fi controller 120 coordinates a uniquely-assigned BSSID for each station in order to provide individualized management of stations connected at any access point.

Further, although the Wi-Fi controller 120 has some network-wide visibility, it is limited to Wi-Fi-relevant information for load balancing, managing a number of station connections at a particular access point, tracking BSSIDs, and the like. While the higher-layer decisions on the access points 130A-N can have some indirect impact on data plane decision making, the SDN controller 110 makes direct data plane decisions. The SDN controller 110 policies, as implemented, can override, co-exist, or compete with policies of the Wi-Fi controller 120 and the access points 130A-N.

The Wi-Fi controller 120 can be implemented in any of the computing devices discussed herein (e.g., see FIG. 9). For example, the Wi-Fi controller 120 can be an MC1500 or MC6000 device by Meru Networks of Sunnyvale, Calif. In one embodiment, the SDN controller 110 and the Wi-Fi controller 120 are integrated into a single physical device. In another embodiment, information concerning network management is passed between the SDN controller 110 and the Wi-Fi controller 120. More embodiments of the Wi-Fi controller 120 are discussed with respect to FIG. 4.

The access points 130A-N tunnel packets of a flow to the SDN controller 110 in a default tunnel mode if there are no local rules instructing on how to handle the packets. The default mode allows the SDN controller 110 the advantage of making layer 2 routing decision, as described herein. In some cases, an OpenFlow rule is received by a particular access point indicating that future packets from the same flow should be handled by a bridge mode, using OpenFlow rules. As a result, that access point sends the packet directly to the destination address. A new data stream or session between the same stations could be handled by the same OpenFlow rules, or initially tunneled to the SDN controller 110 for handling.

To provide network service to the stations 140A-N, in one embodiment, the access points 130A-N comply with IEEE 802.11 protocols (promulgated by the Institute of Electrical and Electronics Engineers) to provide Wi-Fi service to the stations 140A-N over wireless communication channels 115A-N. Under IEEE 802.11, a beacon with one or more BSSIDs is periodically sent to advertise a presence for new connections and maintain current connections. Then the access points 130A-N listen for packets addressed to associated BSSIDs and ignore packets addressed to unassociated BSSIDs. Furthermore, the access points 130A-N forward packets addressed to MAC (Media Access Control) addresses of associated stations.

The access points 130A-N include one or more individual access points implemented in any of the computing devices discussed herein (e.g., see FIG. 9). For example, the access points 130A-N can be an AP 110 or AP 433 (modified as discussed herein) by Meru Networks of Sunnyvale, Calif. A network administrator can strategically place the access points 130A-N for optimal coverage area over a locale. The access points 130A-N can, in turn, be connected to a wired hub, switch or router connected to the network 199. In one embodiment, the access point 130A-N functionality is incorporated into a switch or router.

The stations 140A-N can be, for example, a personal computer, a laptop computer, a tablet computer, a smart phone, a mobile computing device, a server, a cloud-based device, a virtual device, an Internet appliance, or any of the computing devices described herein (see e.g., FIG. 9). No special client is needed for this particular technique, although other aspects of the network may require downloads to the stations 140A-N. The stations 140A-N connect to the access points 130A-N for access to, for example, a LAN (local area network) or external networks using an RF (radio frequency) antenna and network software complying with IEEE 802.11.

FIG. 3 is a more detailed block diagram illustrating the SDN controller 110 of the system 100, according to one embodiment. The SDN controller 110 comprises a data plane manager 310 and an intelligent Wi-Fi flow optimizer 320. The components can be implemented in hardware, software, or a combination of both.

The data plane manager 310 centrally manages layer 2 routing decisions. The data plane manager 310 further comprises data plane policies 312 representing a database, table, or other description of policies stored locally, remotely, or distributed. As referred to herein, data plane policies are layer 2 routing decisions that are implemented outside of intelligent Wi-Fi flow policies. For example, a policy can drop or delay certain packets, or change a priority. The SDN controller can use input gathered across the network to make layer 2 routing decisions for the packets which are communicated back to the forwarding one of the access points 130A-N. In one embodiment, routing decisions are made as a reaction to new or unknown flows. In another embodiment, access points are pre-configured by the SDN controller with rules for automatically implementing SDN controller 110 decisions on matching packets in the future. In still another embodiment, the rules or policies are distributed to the other network devices along a routing path for multi-hop data plane control.

A flow table 314 of the data plane manager 310 maintains a list of current and past flows affected by various policies. In some embodiments, the flow table is exported to other components along with OpenFlow rules. Generally, a flow as referred to herein comprises a series of packets between a common source address and destination address. Each flow can have individual sessions representing a file transfer, login through log off, opening through closing an application, and the like.

The data plane rule module 316 of the data plane manager 310 generates rules (e.g., OpenFlow rules, XML rules, source code, or proprietary commands) in real-time and in response to access point monitoring and/or deep packet inspection. The rules can set up a bridge, tear down a bridge, or implement other actions or settings. Additional modules can be added for other types of analysis and action.

The intelligent Wi-Fi flow optimizer 320 further comprises bridging policies 322 which can be manually or automatically entered. Bridging policy input can be limited to a network administrator with responsibility for a corporate network, or be user friendly enough for any user to adjust. Bridging policies can also be automatically set during an initial set up file for a device. Additionally, the system 100 can automatically discover new device and request a bridging policy. One example of a bridging policy is specific to services such as Apple's Bonjour. A printer or other device offering zero configuration services through Bonjour may be leveraged primarily by nearby stations, and can involve large data transfers. Characteristics of Bonjour packets can be pre-programmed, downloaded, manually entered, or dynamically discovered, for recognition by the intelligent Wi-Fi flow optimizer 320. Another example of a bridging policy concerns a source address and/or a destination address. A location of a Bonjour device can be disclosed for identification whenever a new data stream initiates. In still another example, bridging policies relate to an application such a file transfer application. The bridging policies 322, in some cases, are combined with the data plane policies 312.

The deep packet inspection engine 324 can sniff forwarded packets to determine characteristics of a flow (e.g., applications, video, etc.). Further, a specific application can be detected from patterns related to data field formatting, signatures, metadata, or an explicit identification. One or more packets can be unwrapped as if being received at a destination in order to expose files or commands of higher layers. Some applications can be quickly identified by markings in every packet, while other applications may require analysis of several packets before distinct patterns emerge. In some embodiments, unreliable identifications can be confirmed via query. Other characteristics such as packet frequency or size can be implicit identifiers.

FIG. 4 is a more detailed block diagram illustrating a representative Wi-Fi controller 120 that comprises an access point manager 410, an SDN routing module 430 and a packet queue 440. The components can be implemented in hardware, software, or a combination of both. The access point manager 410 communicates with a group the access points 130A-N for Wi-Fi functionality such as assigning BSSIDs and transferring stations between access points. Then SDN routing module 430 implements OpenFlow compatibility through an interface with the SDN controller 110. In some embodiments, the SDN routing module 430 establishes bridges for access points in a passive or pass-through mode in which packets are tunneled from the access points 130A-N for routing decisions, which are in turn tunneled to the SDN controller 110. Finally, a packet queue 440 stores packets that are being processed or are awaiting further instructions. In one embodiment, the Wi-Fi controller 120 tunnels a copy of a packet stored in the packet queue 440, but receives instructions on how to handle with just a reference to the stored packet for disposition.

FIG. 5 is a more detailed block diagram illustrating a representative access point 130 of the system 100, according to one embodiment. The access point 130 comprises an IEEE 802.11 beacon generation module 510, an IEEE 802.11 station manager 520, an SDN routing module 530, and a packet queue 540. The components can be implemented in hardware, software, or a combination of both.

The IEEE 802.11 beacon generation module 510 generates beacons with embedded BSSIDs and parameters, according to IEEE 802.11 protocols. The IEEE 802.11 station manager 520 stores globally and/or locally-influenced parameter values, policy-based parameter values, manually configured parameter values, or the like. Wi-Fi status data related to a number of connected stations, usage data, and the like can be collected from the IEEE 802.11 beacon generation module 510 and the intelligent Wi-Fi flow optimizer 320 for the SDN controller 110.

The SDN routing module 530 forwards packets and statuses to the SDN controller 110. The first few packets from new data streams can be sent to the SDN controller 110 for analysis. Alternatively, there may already be rules present that direct handling of the new data streams. Example statuses can be a download rate for a specific flow, queue capacity, routing statistics, and more. Periodic updates are made on a regular basis or responsive to change. Additionally, the SDN routing module 530 also receives and implements rules in OpenFlow or other formats. The packet queue 540 stores packets for flows until forwarded to an appropriate station. Delays for a station being steered can be implemented by altering queuing of associated packets.

Figure 6A:
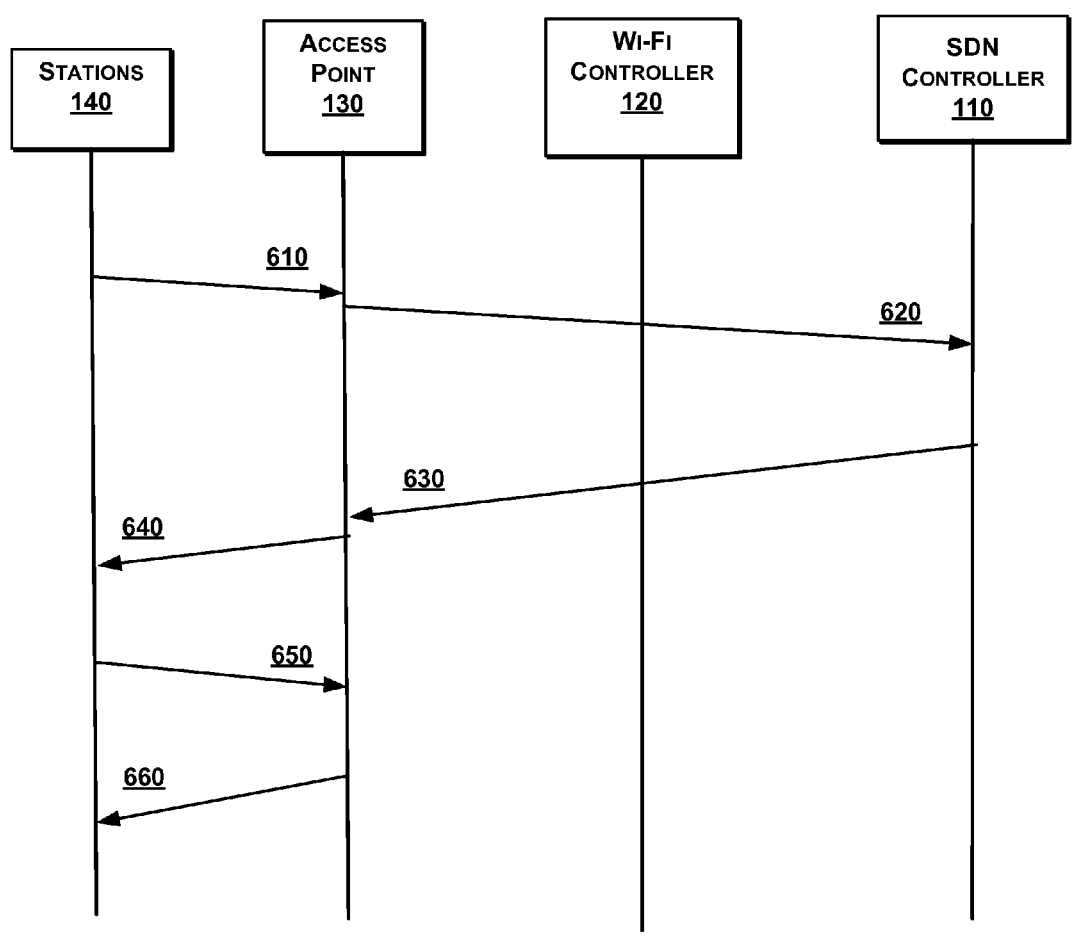
FIGS. 6A-6B are sequence diagrams illustrating components of the system of FIG. 1, according to some embodiments.
Figure 6B:
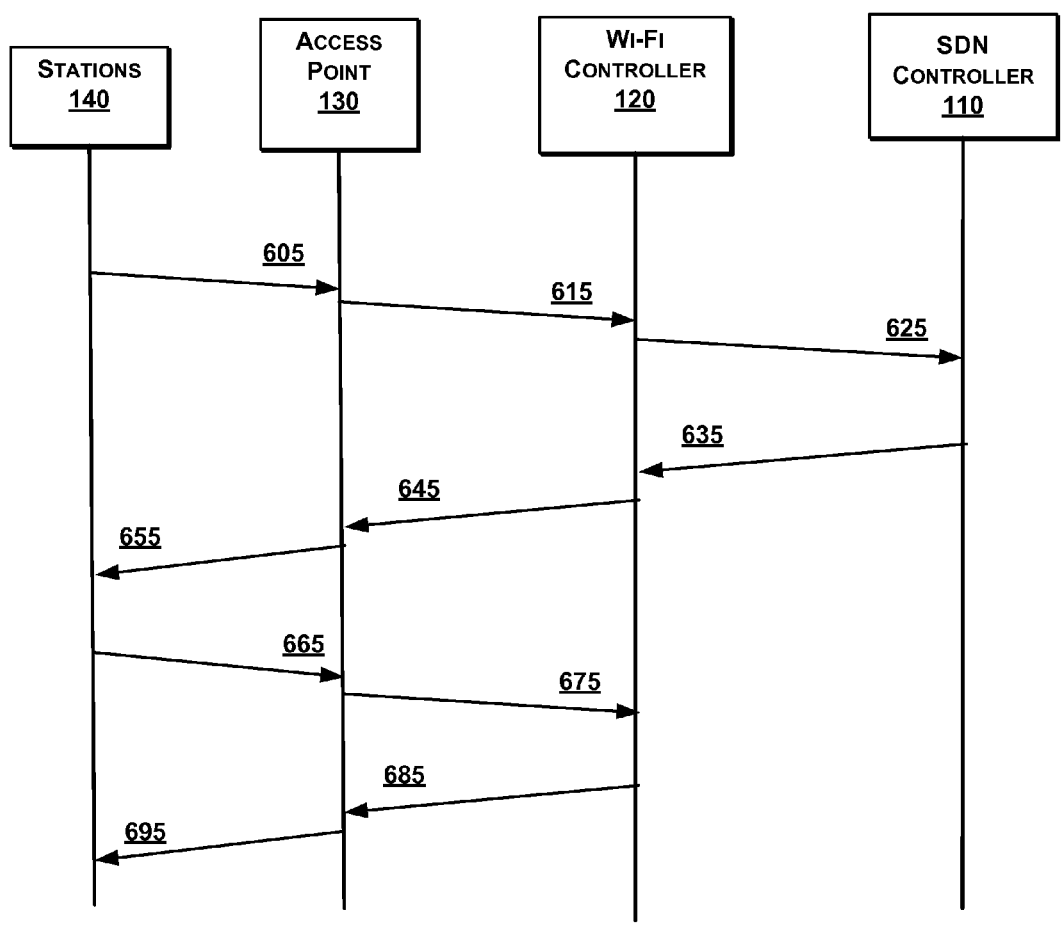

FIGS. 6A-6B are interaction diagrams illustrating example sequences of communications between components of the system 100. The methods operating within the components are discussion below. In a first sequence 600A of FIG. 6A, the access point 130 tunnels directly to the SDN controller 110 (as illustrated in the path 202A of FIG. 2A). By contrast, in a second sequence 600B of FIG. 6B, the Wi-Fi controller 120 tunnels to the SDN controller 110 on behalf of the access point 130 that is in a passive or pass-through mode (as illustrated in the path 202B of FIG. 2B). One of ordinary skill in the art will recognize different variations.

Referring again to FIG. 6A, a flow is initiated between a first station and a second station (interaction 610). Acting under a default tunnel mode, the access point 130 tunnels at least one of the packets to the SDN controller 110. The default tunnel mode is necessary to implement data plane control over the network. Network components, including the access points 130A-N and in some cases the Wi-Fi controller 120 concede layer 2 routing decisions on the data plane to the SDN controller 110. In response to receiving a new data stream, the SDN controller 110 sends OpenFlow data instructing that the flow be continued over a bridge (interaction 630). The packet delivery is completed to the destination address (interaction 640). Subsequent packets are subject to the OpenFlow rules implementing a bridge, so the packet is sent to the access point (interaction 650) and then directly sent to a destination (interaction 660). The bridging occurs, in some embodiments, without any tunneling to the SDN controller 110.

Turning to FIG. 6B, as discussed above, the main contrast is the tunneling paths. Similar to FIG. 6A, a flow is initiated between a first station and a second station (interaction 605). Acting under a default tunnel mode, the access point 130 tunnels at least one of the packets to the Wi-Fi controller 120 (interaction 615) due to a network architecture in which the Wi-Fi controller 120 centrally performs some functions of multiple access points 130 in a domain of the Wi-Fi controller 120. The Wi-Fi controller 120 then tunnels the packets to the SDN controller 110 on behalf of the access points 130 (step 625). In response to receiving a new data stream, the SDN controller 110 sends OpenFlow data instructing that the flow be continued over a bridge this time to the Wi-Fi controller 120 (interaction 635) which forwards to the access point 130 (interaction 645) and similar to FIG. 6A, the packet delivery is completed to the destination address (interaction 655). Subsequent packets are subject to the OpenFlow rules implementing a bridge, so the packet is sent to the access point (interaction 665) which still tunnels to the Wi-Fi controller 120 (interaction 675). But the rule short circuits from the Wi-Fi controller 120 by directly sending the packet back to the access point 130 (interaction 685) and then to a destination (interaction 695). The bridging also occurs, in some embodiments, without any tunneling to the SDN controller 110.

Figure 7:
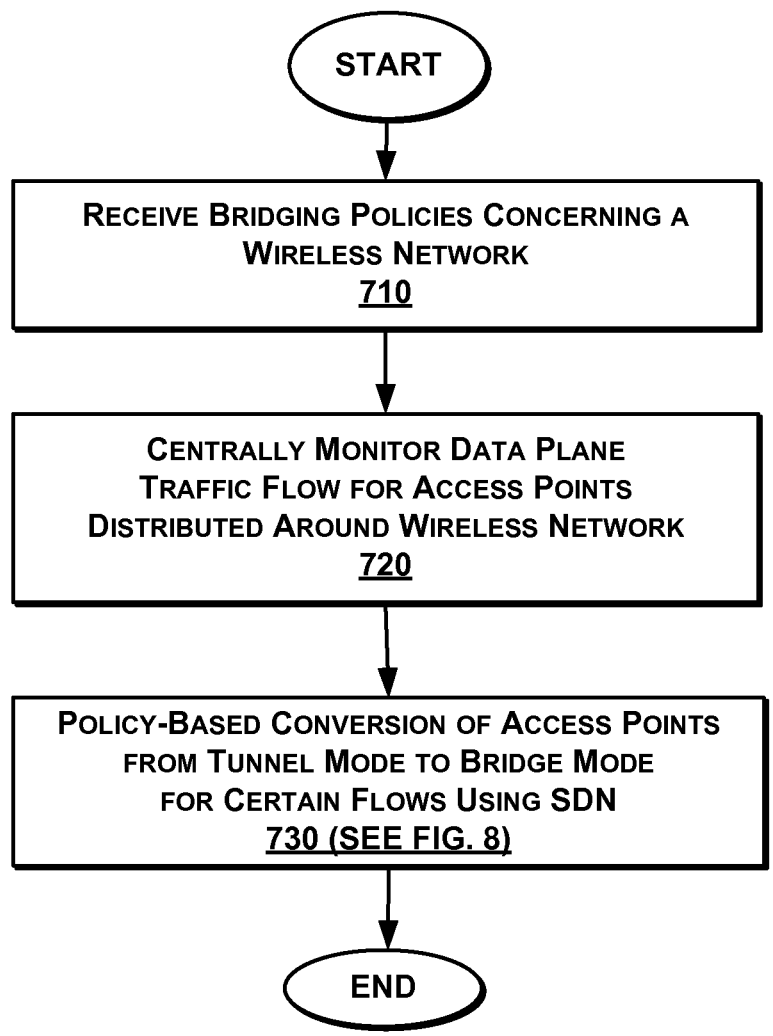
FIG. 7 is a high-level flow diagram illustrating a method for intelligently bridging Wi-Fi flows from a centralized data plane in a wireless communication network, according to one embodiment.
Figure 8:
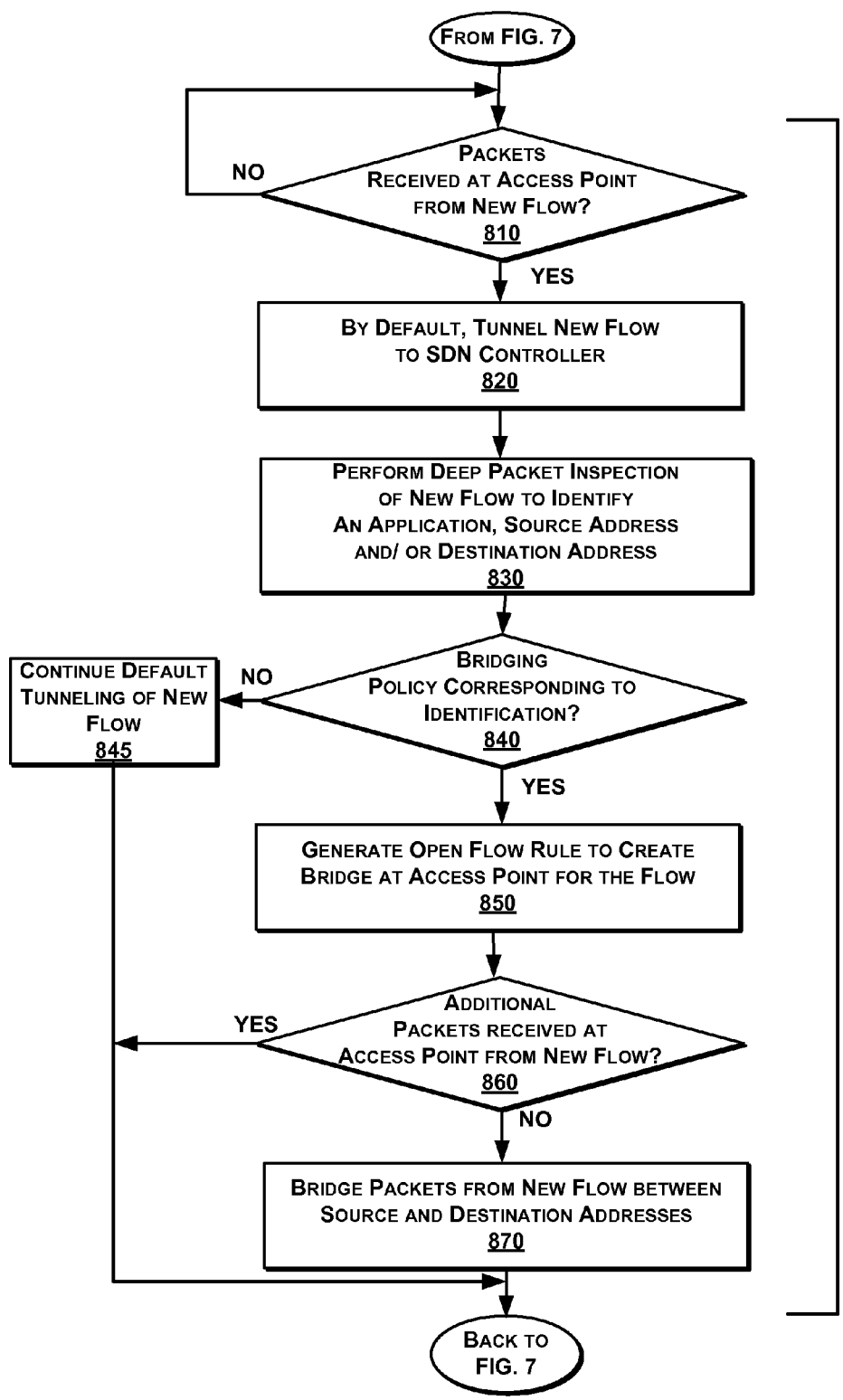
FIG. 8 is a more detailed flow diagram illustrating a step of policy-based conversion of access points from tunnel mode to bridge mode for certain flows using SDN, according to one embodiment.

Methods for Automatically Provisioning Access Points with an SDN Controller (FIG. 7-8)

FIG. 7 is a high-level flow diagram illustrating a method for self-provisioning a centralized data plane in a wireless communication network (e.g., in the SDN controller 110 of FIG. 1), according to one embodiment. One of ordinary skill in the art will recognize that the method 700 is non-limiting as other embodiments can have more or less steps and can be performed in a different order.

Bridging policies concerning traffic flow for the wireless communication network are received and stored (step 710). Data plane traffic flow is centrally monitored for each of the plurality of access points distributed around the wireless communication network, in particular to detect new data streams (step 720). Certain flows at an access point are converted from tunnel mode to bridge mode based on policies (step 730), as detailed in FIG. 8.

FIG. 8 is a more detailed flow diagram illustrating the step 730 of policy-based conversion of access points from tunnel mode to bridge mode for certain flows using SDN, according to one embodiment.

Once identified (step 810), new data streams of packets are tunneled by an access point to an SDN controller (step 820) where deep packet inspection of the packets is performed (step 830). If a bridging policy is identified as corresponding to the new data stream (step 840), an OpenFlow rule is generated and sent to create a bridge for the new data stream (step 850). Consequentially, additional packets received from the new data stream (step 860) are bridged between the source and destination addresses (step 870). On the other hand, if no bridging policy is identified, tunneling of the flow to the SDN controller continues (845).

Generic Computing Device (FIG. 9)

FIG. 9 is a block diagram illustrating an exemplary computing device 900 for use in the system 100 of FIG. 1, according to one embodiment. The computing device 900 is an exemplary device that is implementable for each of the components of the system 100, including the SDN controller 110, the Wi-Fi controller 120, the access points 130A-N, and the stations 140A-N. The computing device 900 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 900, of the present embodiment, includes a memory 910, a processor 920, a storage drive 930, and an I/O port 940. Each of the components is coupled for electronic communication via a bus 999. Communication can be digital and/or analog, and use any suitable protocol.

The memory 910 further comprises network applications 912 and an operating system 914. The network applications 912 can include the modules of the SDN controller 110, the Wi-Fi controller 120, or the access point 130, as illustrated in FIGS. 3-5. Other network applications 912 can include a web browser, a mobile application, an application that uses networking, a remote application executing locally, a network protocol application, a network management application, a network routing application, or the like.

The operating system 914 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 920 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 920 can be single core, multiple core, or include more than one processing elements. The processor 920 can be disposed on silicon or any other suitable material. The processor 920 can receive and execute instructions and data stored in the memory 910 or the storage drive 930

The storage drive 930 can be any non-volatile type of storage such as a magnetic disc, EEPROM (electronically erasable programmable read-only memory), Flash, or the like. The storage drive 930 stores code and data for applications.

The I/O port 940 further comprises a user interface 942 and a network interface 944. The user interface 942 can output to a display device and receive input from, for example, a keyboard. The network interface 944 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method for intelligent bridging of Wi-Fi flows in a software-defined network (SDN) controller in a wireless communication network by centrally coordinating data plane behavior, the method comprising the steps of:
   receiving a bridging policy of a plurality of policies concerning bridging of at least one specific type of traffic flow for the wireless communication network;
   centrally monitoring data plane traffic flow at each of the plurality of access points distributed around the wireless communication network;
   receiving a new data stream at the SDN controller from an access point of the plurality of access points, the new data stream being tunneled from the access point in a default tunneling mode for new data streams at the access point, the new data stream comprising at least one packet sent from a first station to a second station;
   matching the bridging policy to the new data stream by identifying characteristics of the new data stream with deep packet inspection on the at least one packet from the new data stream; and
   responsive to matching the new data stream to the bridging policy, converting the tunnel mode to a bridge mode by sending a rule concerning the new data stream to the access point so that subsequent packets of the new data stream are transferred at the access point without tunneling additional packets to the SDN controller.

2. The method of claim 1, wherein the rule concerning the new data stream is an OpenFlow rule that affects handling of packets at layer 2.

3. The method of claim 1, wherein converting of tunneling mode to bridge mode occurs at the access point.

4. The method of claim 1, wherein converting of tunneling mode to bridge mode occurs at a Wi-Fi controller, the Wi-Fi controller receiving packets as forwarded by the access point.

5. The method of claim 1, wherein matching the bridging policy to the new data stream comprises matching an application or service of the bridging policy to an application or service of the new data stream.

6. The method of claim 1, wherein matching the bridging policy to the new data stream comprises matching a source address or a destination address of the bridging policy to a source address or a destination address of the new data stream.

7. The method of claim 1, wherein responsive to not matching the new data stream to the bridging policy, not sending a rule concerning the new data stream to the access point so that subsequent packets of the new data stream continue to be tunneled to the SDN controller.

8. The method of claim 1, wherein at least two of the plurality of access points implementing the rules are manufactured by different vendors and have distinct operating systems.

9. A non-transitory computer-readable medium storing source code that, when executed by a processor, performs a method for intelligent bridging of Wi-Fi flows in a software-defined network (SDN) controller in a wireless communication network by centrally coordinating data plane behavior, the method comprising the steps of:

receiving a bridging policy of a plurality of policies concerning bridging at least one specific type of traffic flow for the wireless communication network;

centrally monitoring data plane traffic flow at each of the plurality of access points distributed around the wireless communication network;

receiving a new data stream at the SDN controller from an access point of the plurality of access points, the new data stream being tunneled from the access point in a default tunneling mode for new data streams at the access point, the new data stream comprising at least one packet sent from a first station to a second station;

matching the bridging policy to the new data stream by identifying characteristics of the new data stream with deep packet inspection on the at least one packet from the new data stream; and responsive to matching the new data stream to the bridging policy, converting the tunnel mode to a bridge mode by sending a rule concerning the new data stream to the access point so that subsequent packets of the new data stream are transferred at the access point without tunneling additional packets to the SDN controller.

10. An SDN (Software-Defined Networking) controller that intelligently bridges Wi-Fi flows in a wireless communication network by centrally coordinating data plane behavior, the SDN controller comprising:

a processor; and
a memory, storing:
  a first module to receive a bridging policy of a plurality of policies concerning bridging at least one specific type of traffic flow for the wireless communication network;
  a second module to centrally monitor data plane traffic flow at each of the plurality of access points distributed around the wireless communication network;
  a third module to receive a new data stream at the SDN controller from an access point of the plurality of access points, the new data stream being tunneled from the access point in a default tunneling mode for new data streams at the access point, the new data stream comprising at least one packet sent from a first station to a second station;
  a fourth module to match the bridging policy to the new data stream by identifying characteristics of the new data stream with deep packet inspection on the at least one packet from the new data stream; and
  a fifth module to, responsive to matching the new data stream to the bridging policy, convert the tunnel mode to a bridge mode by sending a rule concerning the new data stream to the access point so that subsequent packets of the new data stream are transferred at the access point without tunneling additional packets to the SDN controller.

* * * * *